US009543845B2

(12) United States Patent
Del Carmen, Jr.

(10) Patent No.: US 9,543,845 B2
(45) Date of Patent: Jan. 10, 2017

(54) GENERATING A CONTROL SIGNAL BASED ON LEADING EDGE DIMMING DETECTION FOR MAINTAINING INPUT CURRENT OF A POWER CONVERTER

(71) Applicant: Power Integrations, Inc., San Jose, CA (US)

(72) Inventor: Jose Requinton Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 144 days.

(21) Appl. No.: 14/487,862

(22) Filed: Sep. 16, 2014

(65) Prior Publication Data

US 2015/0103568 A1    Apr. 16, 2015

Related U.S. Application Data

(60) Provisional application No. 61/891,295, filed on Oct. 15, 2013, provisional application No. 61/898,883, filed on Nov. 1, 2013.

(51) Int. Cl.
*H02M 3/335*    (2006.01)
*H05B 33/08*    (2006.01)
(Continued)

(52) U.S. Cl.
CPC ......... *H02M 3/33507* (2013.01); *H02M 7/217* (2013.01); *H05B 33/0815* (2013.01);
(Continued)

(58) Field of Classification Search
CPC .................... H02M 3/33507; H02M 3/33523; H02M 7/217
See application file for complete search history.

(56) References Cited

U.S. PATENT DOCUMENTS

2011/0309759 A1*  12/2011  Shteynberg ........ H05B 33/0815
                                              315/201
2012/0025729 A1*  2/2012  Melanson .......... H05B 33/0815
                                              315/224
(Continued)

OTHER PUBLICATIONS

CN 201420596094.9—Second Chinese Office Action with English translation, issued Jan. 21, 2015 (4 pages).
(Continued)

*Primary Examiner* — Jue Zhang
*Assistant Examiner* — Lakaisha Jackson
(74) *Attorney, Agent, or Firm* — Blakely Sokoloff Taylor & Zafman LLP (57) ABSTRACT

A power converter includes an energy transfer element, a power switch, a controller and a leading edge dimming detection circuit. The controller is coupled to control switching of the power switch to regulate the output of the power converter by controlling a transfer of energy through the energy transfer element. The leading edge dimming detection circuit is coupled to generate a control signal in response to detecting leading edge dimming at the input of the power converter. In one aspect, the leading edge dimming detection circuit detects the leading edge dimming and then generates a control signal to engage a compensator which maintains the input current of the power converter to be equal to or greater than a minimum current. In another aspect, the leading edge dimming detection circuit detects and reutilizes the turn-on current spike energy of a leading edge dimmer.

29 Claims, 7 Drawing Sheets

(51) Int. Cl.
*H02M 7/217* (2006.01)
*H02M 1/00* (2006.01)

(52) U.S. Cl.
CPC ..... *H05B 33/0845* (2013.01); *H02M 3/33523* (2013.01); *H02M 2001/007* (2013.01)

(56) References Cited

U.S. PATENT DOCUMENTS

| | | | | |
|---|---|---|---|---|
| 2012/0112651 A1* | 5/2012 | King | ................ | H05B 33/0815 315/224 |
| 2012/0112721 A1* | 5/2012 | Wu | ................ | H02M 3/156 323/288 |
| 2013/0002163 A1* | 1/2013 | He | ................ | H05B 33/0815 315/228 |
| 2013/0221871 A1* | 8/2013 | King | ................ | H05B 37/02 315/254 |

OTHER PUBLICATIONS

CN 201420596094.9—First Chinese Office Action with English translation, issued Dec. 17, 2014 (4 pages).

* cited by examiner

GENERATING A CONTROL SIGNAL BASED ON LEADING EDGE DIMMING DETECTION FOR MAINTAINING INPUT CURRENT OF A POWER CONVERTER

CROSS-REFERENCE TO RELATED APPLICATIONS

This application claims the benefit of U.S. Provisional Application No. 61/891,295, filed Oct. 15, 2013. This application also claims the benefit of U.S. Provisional Application No. 61/898,883, filed Nov. 1, 2013. U.S. Provisional Application Nos. 61/891,295 and 61/898,883 are hereby incorporated by reference.

BACKGROUND INFORMATION

Field of the Disclosure

This disclosure relates to power converters and, more particularly, to power converters that drive light emitting diode (LED) lighting with triac dimming circuity.

Background

Light emitting diode (LED) lighting has become very popular in the industry due to their many advantages including a longer lifespan, fewer hazards and increased visual appeal when compared to other lighting technologies, such as for example compact fluorescent lamp (CFL) or incandescent lighting technologies. The advantages provided by LED lighting have resulted in LEDs being incorporated into a variety of lighting technologies, televisions, monitors and other applications that may also require dimming.

One known technique for dimming is the use of a Triac or phase angle dimming. A Triac circuit operates by removing some beginning or ending portion of each half-cycle of ac power, which is known as "leading edge or trailing edge phase control", respectively. By eliminating some portion of each half-cycle, the amount of power delivered to the lamp is reduced and the light output appears dimmed to the human eye. In most applications, the missing portion of each half-cycle is not noticeable to the human eye because the variations in the phase controlled line voltage and the variations of power delivered to the lamp occur so quickly. While the triac dimming circuits work especially well to dim incandescent light bulbs, when they are used for dimming LED lamps they are likely to produce non-ideal results, such as flickering, blinking, color shifting and input waveform distortions.

One difficulty in using Triac dimming circuits with LED lamps comes from a characteristic of the Triac itself. A Triac behaves as a controlled ac switch that is open until it receives a trigger signal at a control terminal, which causes the switch to close. The switch remains closed as long as the current through the switch is above a value referred to as the holding current. Most incandescent lamps easily draw more than the minimum holding current from the ac power source to enable reliable and consistent operation of a Triac. However, the low currents drawn by LEDs may not be enough to maintain the minimum holding currents required to keep Triac switches conducting for a reliable operation.

Even though the Triac-based, leading or trailing edge, phase control dimmer LED drivers may provide light dimming with a low cost, since the current drawn by the string of LED lamps may easily go below the holding current of the Triac dimming circuit, it may cause the undesirable behavior including limited dimming range, flickering and input waveform distortions. The Triac may fire inconsistently as a result of the low current drawn by the LED string. In addition, due to the inrush current charging the input capacitance of the circuit and because of the relatively large impedance that the string of LEDs presents to the line, a significant ringing may occur whenever the Triac turns on. This ringing may cause even more undesirable behavior as the Triac current could fall to zero and turn off the string of LEDs, resulting in flicker.

As a consequence, the LED driver may include either a compensator circuit (e.g., a bleeder, or dummy load/preload) or the LED driver may rely on the controller itself to increase current demand from the Triac dimmer. A bleeder circuit is in fact a dummy load consisting of passive or active components added at the input or output to take enough extra current in addition to the LEDs to keep the Triac conducting reliably after it is triggered. Low cost passive bleeders are common and popular in LED driver circuits with their associated penalties in efficiency and performance.

BRIEF DESCRIPTION OF THE DRAWINGS

Non-limiting and non-exhaustive embodiments of the present disclosure are described with reference to the following figures, wherein like reference numerals may refer to like parts throughout the various figures.

Corresponding reference characters may indicate corresponding components throughout the several views of the drawings. Skilled artisans will appreciate that elements in the figures are illustrated for simplicity and clarity and have not necessarily been drawn to scale. Common but well-understood elements that are useful or necessary in commercially feasible embodiments are often not depicted in order to facilitate understanding of the various embodiments.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality.

Embodiments of the present disclosure include a power converter that includes a leading edge dimming detection circuit to recognize the operation of the power converter with leading edge phase control. In one example, the leading edge dimming detection circuit detects the leading edge dimming and then generates a control signal to engage a compensator which then maintains the input current of the power converter to be equal to or greater than a minimum current (e.g., holding current of the Triac). In another example, the leading edge dimming detection circuit detects and reutilizes (reclaims) the turn-on current spike energy of a leading edge dimmer, in one example through an engaged damper circuit, to vary a feedback FB signal received by the controller in order to increase the input current drawn by the power converter.

Figure 1A:
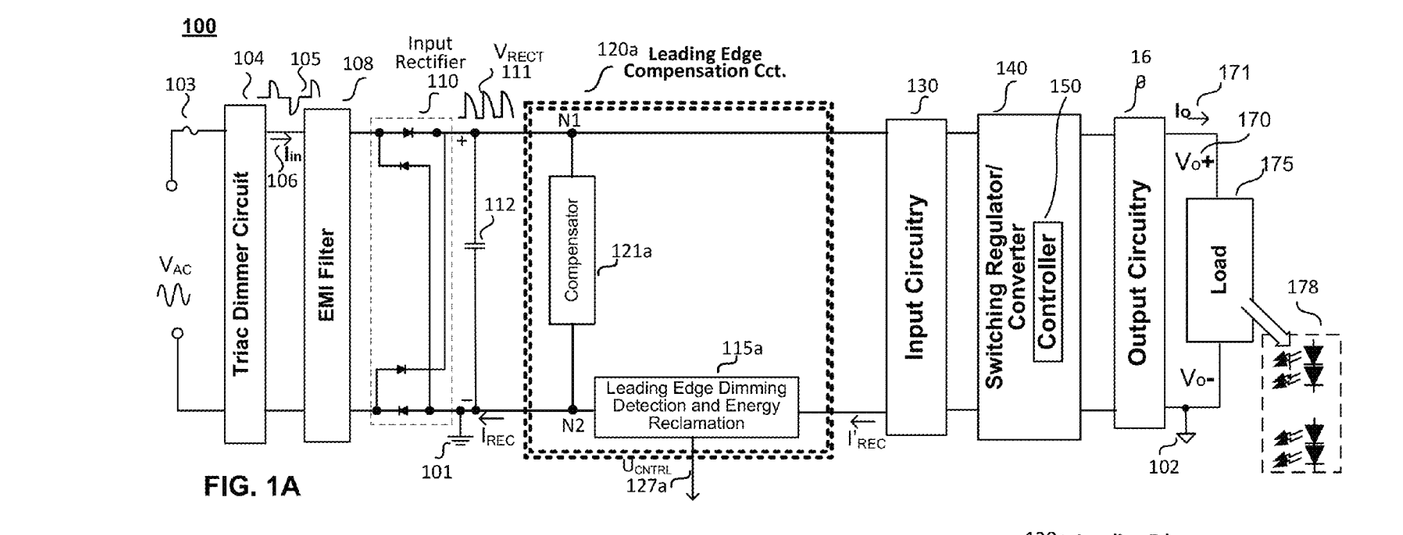
FIG. 1A is an example schematic diagram of a power converter having a leading edge compensation circuit that is coupled to detect leading edge dimming in a return current of the power converter, in accordance with the teachings of the present disclosure.

FIG. 1A is an example schematic diagram of a power converter 100 having a leading edge compensation circuit 120a that is coupled to detect leading edge dimming in a return current of the power converter, in accordance with the teachings of the present disclosure. Leading edge compensation circuit 120a is shown as including a compensator 121a and a leading edge dimming detection and spike energy reclamation circuit 115a. In one example, power converter 100 is an LED driver that is coupled to drive load 175 that may include an array of LED lamps 178. As shown power converter 100 is coupled to a Triac dimmer circuit 104. In one embodiment, leading edge dimming detection and energy reclamation circuit 115a includes a spike energy reclamation circuit (discussed below) which recovers/reclaims the Triac turn-on spike energy to generate a control signal 127a.

As shown, Triac dimming circuit 104 is coupled to receive full sinusoidal waveform at input ac line signal $V_{AC}$ from the input terminal through a fusible protection device 103. Triac dimming circuit 104 may apply a phase controlled voltage, either by cutting (delaying) the beginning of each half-cycle of the input ac line signal $V_{AC}$ (leading-edge control) or by cutting the end portion of each half-cycle of input ac line signal $V_{AC}$ (trailing-edge control), to produce a phase controlled Triac signal 105. By eliminating a portion of each half-cycle of the input ac line signal $V_{AC}$, the amount of power delivered to the load 175 (e.g., an array of LED lamps 178) is reduced and the light output of the LED appears dimmed. The LED driver may further include input rectifier bridge 110 coupled to receive Triac signal 105 through electromagnetic interference (EMI) filter 108. As shown in the depicted example, the rectified voltage $V_{RECT}$ 111 produced by the rectifier bridge 110 is filtered by filter capacitor 112 and has a conduction phase angle in each half line cycle that is controlled by the Triac circuit 104.

The leading edge compensation circuit 120a receives the rectified voltage $V_{RECT}$ 111, detects a leading edge dimming and recovers/reclaims the Triac turn-on spike energy through the circuit block 115a. A control signal 127a is generated by the recovered/reclaimed energy that could be used by the power converter to maintain the input current of the power converter (e.g., for compensator active switching or as a control signal compensation or for any other purpose in the converter). Compensator 121a is coupled across the input nodes N1 and N2 and may be a current sink circuit consisting of passive and/or active components; e.g; a passive or active bleeder. The output of the leading edge compensation circuit block 120a couples through some optional input circuitry 130 to a switching regulator/converter 140 including a controller 150 which through the output circuitry 160 applies output voltage $V_o$ 170 and output current $I_o$ 171 to the load 175 that in one example is an array 178 of LEDs. If the regulated converter is an isolated converter the secondary side ground 102 may differ from the primary ground 101.

Figure 1B:
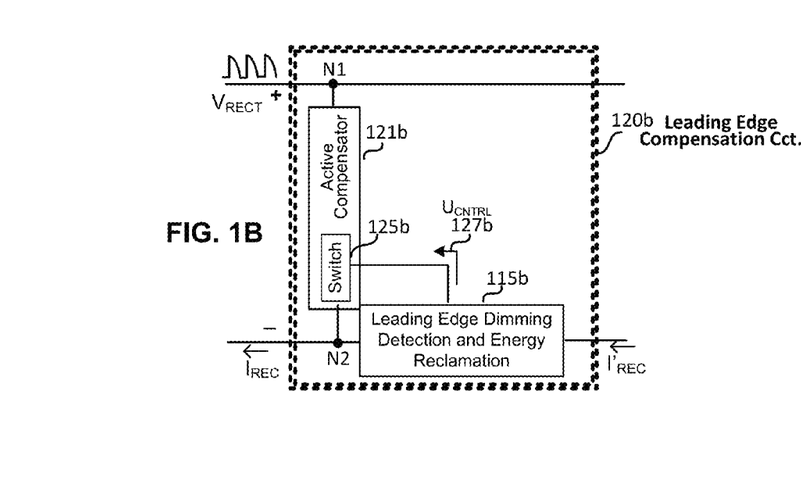
FIG. 1B is an example schematic diagram of a leading edge compensation circuit that is coupled to detect leading edge dimming in a return current of the power converter and to generate a control signal to engage an active compensator, in accordance with the teachings of the present disclosure.

FIG. 1B is an example schematic diagram of a leading edge compensation circuit 120b that is coupled to detect leading edge dimming in a return current ($I_{REC}$) of the power converter and to generate a control signal 127b to engage an active compensator 121b, in accordance with the teachings of the present disclosure. As shown in FIG. 1B, active compensator 121b is coupled across the input nodes N1 and N2 where the leading edge dimming detection and energy reclamation circuit 115b is coupled in series along the input return line. In the illustrated example of FIG. 1B, leading edge dimming detection circuit 115b detect the present of leading edge dimming in response to the return current and then provides control signal $U_{CNTRL}$ 127B to engage the active compensator 121b by turning on switch 125b. In one example, compensator 121b, when engaged, is configured to maintain the input current of the power converter to at least a minimum current, which may be equal to the holding current of triac dimmer circuit 104.

Figure 1C:
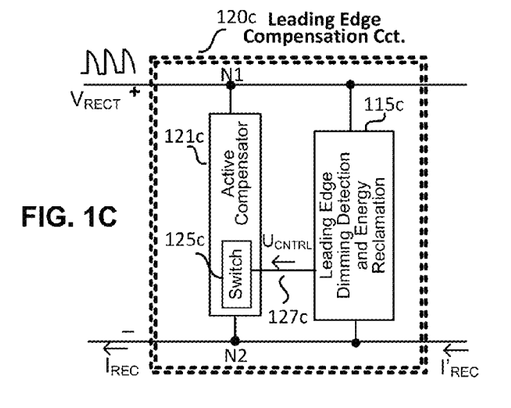
FIG. 1C is an example schematic diagram of a leading edge compensation circuit that is coupled to detect leading edge dimming in an input voltage of the power converter and to generate a control signal to engage an active compensator, in accordance with the teachings of the present disclosure.

FIG. 1C is an example schematic diagram of a leading edge compensation circuit 120c that is coupled to detect leading edge dimming in an input voltage of the power converter and to generate a control signal to engage an active compensator 121c, in accordance with the teachings of the present disclosure. Active compensator 121c is coupled across the input nodes N1 and N2 where the leading edge dimming detection circuit 115c is coupled in parallel across the input line voltage and provides control signal $U_{CNTRL}$ 127c for engaging the active compensator switch.

Figure 2A:
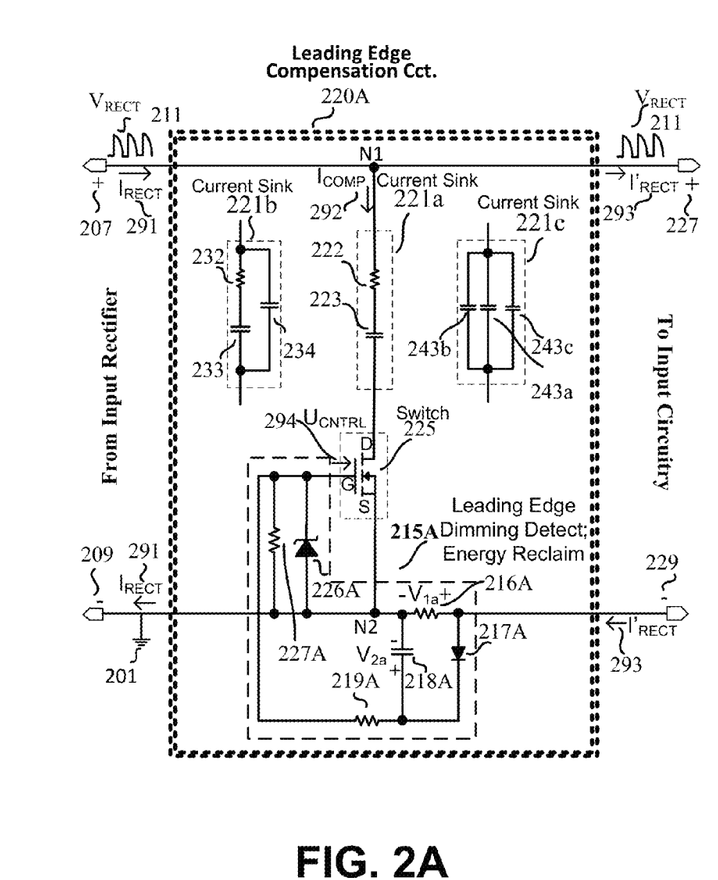
FIG. 2A is an example schematic diagram illustrating a leading edge compensation circuit having a current sink or bulk capacitor module, in accordance with the teachings of the present disclosure.

FIG. 2A is an example schematic diagram illustrating a leading edge compensation circuit 220A having a current sink 221a, current sink 221b, or a bulk capacitor module 221c, in accordance with the teachings of the present disclosure. Input terminals 207 and 209 from input rectifier receive the rectified input voltage $V_{RECT}$ 211 and input current $I_{REC}$ 291. The leading edge compensation circuit 220A includes an active compensator that includes a current sink or bulk capacitor module that is coupled to sink a compensation current $I_{COMP}$ 292 from nodes N1 to N2. It is appreciated that different combination of components for the current sink may be applicable that are not limited to the introduced examples of 221a, 221b or 221c. Current sink 221a may consist of the series coupling of resistor 222 and capacitor 223. Current sink 221b shows series coupling of resistor 232 and capacitor 233 in parallel to the capacitor 234. Current sink 221c only consists of parallel capacitors 243a, 243b and 243c that may minimize the power/thermal loss in the current sink circuit. The active component of the compensator (depicted as switch 225; e.g, a MOSFET switch) is controlled by the control signal $U_{CNTRL}$ 294 (e.g., applied to the gate of MOSFET).

The leading edge dimming detection circuit 215A includes resistor 216A that in one example could be the damper resistor in return line of the LED driver (i.e., power converter). The voltage drop $V_{1a}$ on resistor 216A due to the Triac turn on spike in reference to ground 201 through diode 217A charges capacitor 218A to an average voltage $V_{2A}$. It is appreciated that diode 217A is required to prevent any negative oscillating voltage discharging capacitor 218A. Voltage $V_{2A}$ across capacitor 218A through resistor divider 219A and 227A, applies a control signal $U_{CNTRL}$ 294 to the control terminal G of switch 225 and the Zener 226A across the G terminal protects against any undesirable overshoot. Output terminals 227 and 229 of circuit block 220A would be coupled to the input circuitry 130 as depicted in FIG. 1A. It is appreciated that due to sinking a compensation current $I_{COMP}$ 292 the current I' RECT at output terminal of block 220A may differ from the current $I_{RECT}$ at input terminal of block 220A.

Figure 2B:
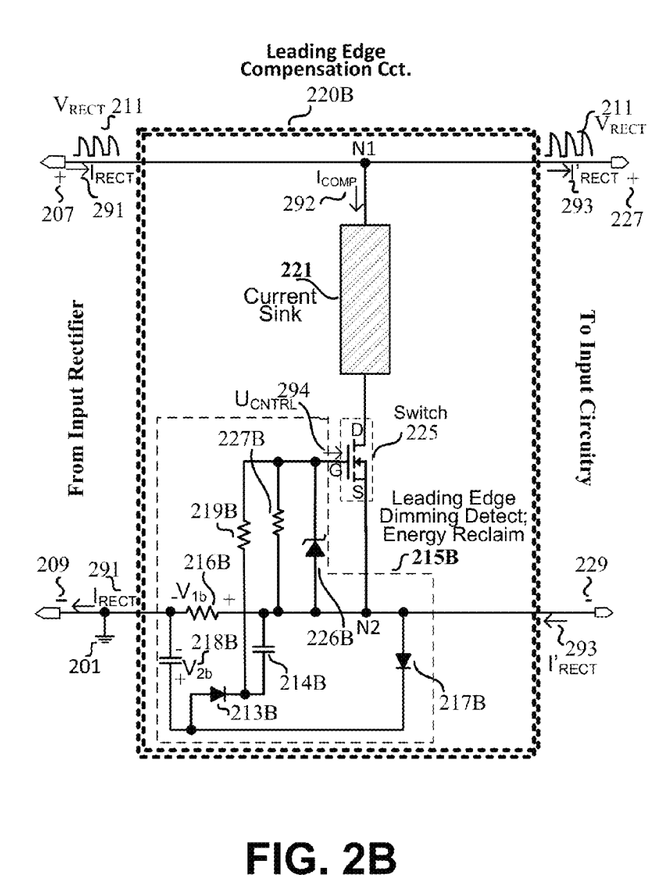
FIG. 2B is an example schematic diagram illustrating a leading edge compensation circuit having a current sink, in accordance with the teachings of the present disclosure.

FIG. 2B is an example schematic diagram illustrating a leading edge compensation circuit 220B having a current sink 221, in accordance with the teachings of the present disclosure. In one embodiment, current sink 221 could be any of the introduced current sink options 221a, 221b or 221c of the active compensator in FIG. 2A or any other possible option. Input terminals 207 and 209 from input rectifier receive the rectified input voltage $V_{RECT}$ 211 and input current $I_{RECT}$ 291. The leading edge compensation circuit 220B includes an active compensator of the current sink 221 sinking a compensation current $I_{COMP}$ 292 across the nodes N1 and N2. The leading edge dimming detection circuit 215B generates control signal $U_{CNTRL}$ 294 which is then applied to the control terminal gate of the MOSFET switch 225 to engage the current sink 221.

In the example of the leading edge dimming detection circuit 215B of FIG. 2B, resistor 216B (i.e., a damper resistor) is located at the input rectifier side in return line of the LED driver. The resistor 216B voltage drop $V_{1b}$ due to the Triac turn on spike (in reference to ground 201) through diode 217B charges capacitor 218B to an average voltage $V_{2b}$ and prevents capacitor 218B to discharge due to any possible negative oscillation. The smaller capacitor 214B charges faster through the diode 213B to provide a faster response to the transients. Resistors 219B and 227B form a divider that applies a fraction of the stored voltage $V_{2b}$ (averaged for multiple switching cycles across capacitor 218B) or applies a fraction of the voltage across capacitor 214B at each switching cycle as a control signal $U_{CNTRL}$ 294 to allow sinking of current through the compensator. The Zener diode 226A across the G terminal may protect against any undesirable overshoot. As explained in FIG. 2A the output terminals 227 and 229 may couple to the input circuitry.

Figure 3A:
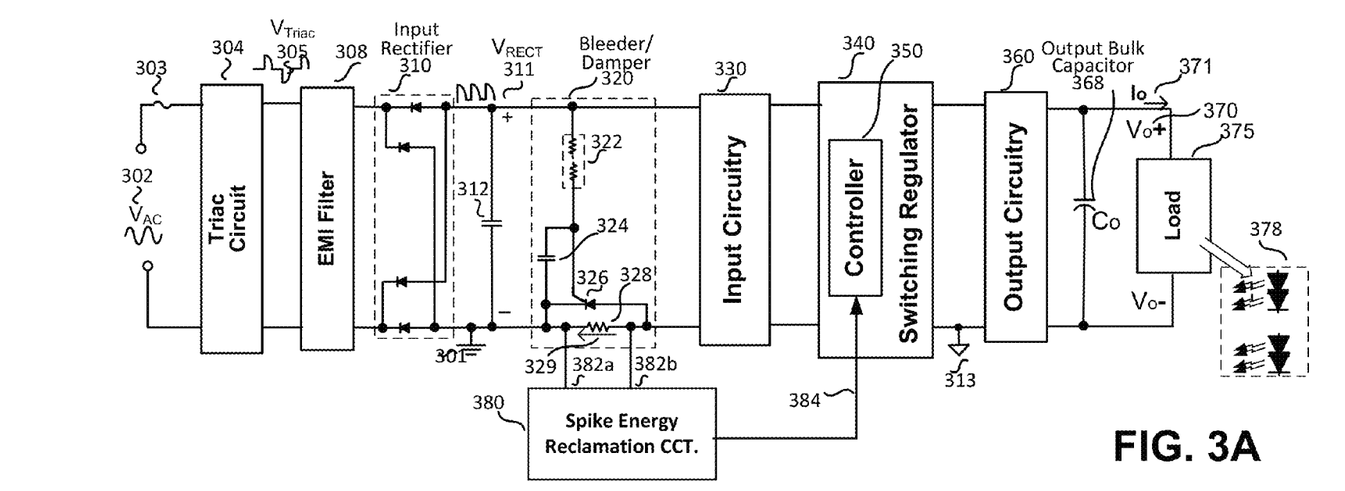
FIG. 3A is an example schematic diagram illustrating a power converter having a spike energy reclamation circuit, in accordance with the teachings of the present disclosure.

FIG. 3A is an example schematic diagram illustrating a power converter having a spike energy reclamation circuit 380, in accordance with the teachings of the present disclosure. FIG. 3A shows yet another way of reclaiming the turn-on spike energy to be utilized in the controller circuitry to compensate misbehavior of the LED driver at load drop (i.e., compensate the holding current for a stable operation).

In the example of FIG. 3A, the Triac dimming circuit 304 applies a phase controlled voltage from the full sinusoidal waveform 302 received at input ac line signal $V_{AC}$ from the input terminal through a fusible protection device 303. The rectifier bridge 310 is coupled to receive Triac signal $V_{TRIC}$ 305 through electromagnetic interference (EMI) filter 308. The rectified phase controlled signal $V_{RECT}$ 311 filtered by the filter capacitor 312 has a conduction angle in each half line cycle that is controlled by the Triac circuit 304 to control amount of power delivered to the load 375 (e.g., LED lamps array 378) and dim the output light of the LEDs.

In FIG. 3A a smart bleeder plus damper circuit 320 is coupled at the input (primary side) before input circuitry 330 and switching regulator 340. The bleeder damper circuitry 320 in one example includes a resistor module 322 in series with capacitor 324 which form a passive bleeder. Resistor 328 may act for damping the turn on spike current in return path of the input current. Thyristor 326 is coupled across the damper resistor 328 and control terminal of the thyristor 326 is coupled to the voltage across capacitor 324. The anode and cathode of thyristor 326 may shunt the damper resistor 328 whenever capacitor 324 is charged to the activation threshold of thyristor 326. At leading edge turn on spike through the bleeder no voltage appears across the capacitor 324, thyristor 326 remains OFF (open circuit) and return current 329 passes through the damper resistor 328. However, after the turn on spike, that voltage across capacitor 324 rises to the threshold of thyristor 326, resistor 328 is shorted to eliminate resistor loss and increase efficiency.

In the example of FIG. 3A, spike energy reclamation circuit 380 is coupled to 382a and 382b across the triac current damper resistor 328 that recovers spike energy drop on damper resistor to generate a control signal 384 to be utilized in controller 350 of the switching regulator 340 which may be reutilized (to compensate the low dim holding current or for any other purpose in the converter) to increase the efficiency.

The output of the switching regulator/converter 340 through the output circuitry 360 applies output voltage $V_o$ 370 across output bulk capacitor Co 368 and provides output current $I_o$ 371 to the load 375 that in one example is an array 378 of LEDs. If the switching regulator (converter) is of an isolated type the secondary side ground 313 may differ from the primary ground 301.

Figure 3B:
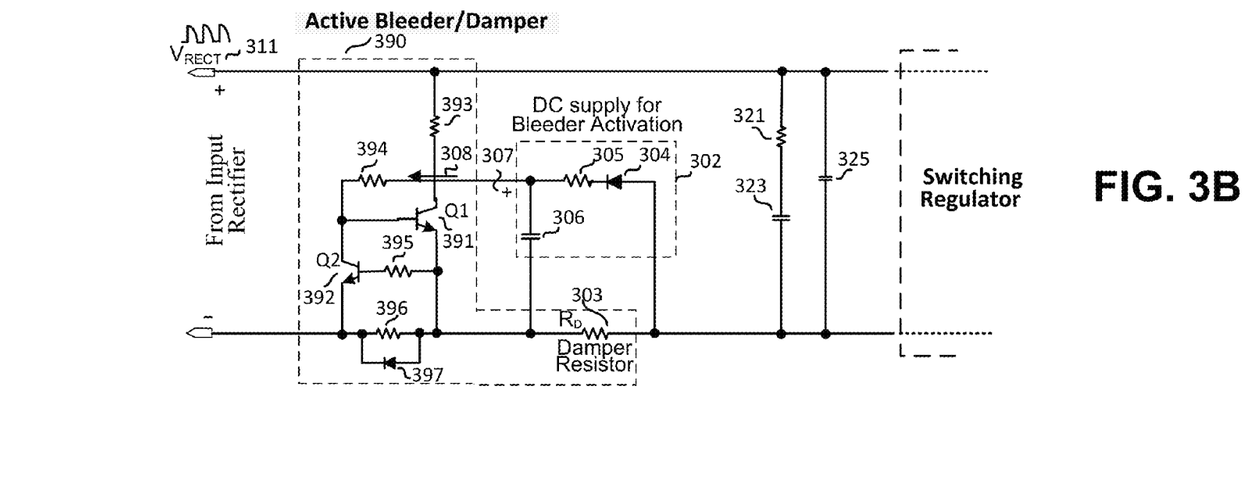
FIG. 3B is an example schematic diagram illustrating a spike energy reclamation circuit coupled to provide leading edge dimming engagement of an active bleeder circuit, in accordance with the teachings of the present disclosure.

FIG. 3B is an example schematic diagram illustrating a spike energy reclamation circuit 302 coupled to provide leading edge dimming engagement of an active bleeder circuit 390, in accordance with the teachings of the present disclosure. In accordance with the teachings of the present disclosure, the control signal 308 for the switching element in the active bleeder is generated from the reclaimed spike energy on the damper resistor that otherwise would be part of the circuit loss.

For example, circuit block 390 (active bleeder/damper) is coupled across the rectified voltage terminal $V_{RECT}$ 311 with the phase controlled waveform. The active bleeder/damper block 390 includes bleeder components: resistor 393 and bleeder switch (e.g., BJT Q1 391). The DC supply for bleeder activation 302 receives the voltage drop on the damper resistor RD 303 during the triac turn on spike and charges capacitor 306 through diode 304 and resistor 305 to generate the DC voltage 307 across capacitor 306 and provide activation signal 308 for the bleeder switch Q1 391. Transistor Q1 391 is pulled up to voltage 307 through resistor 394 unless transistor Q2 392 is activated through resistors 395 and 396 during the triac turn on spike that the voltage drop across resistor 396 may rise higher than turn on threshold of transistor Q2 392. Diode 397 across resistor 396 may limit the voltage drop across resistor 396 to forward drop of diode 397 (e.g., 0.7V).

The input terminals from input rectifier of the LED driver after the blocks 390 and 302 may couple through some filter components (e.g., resistor 321, capacitor 323 and capacitor 325 as depicted on FIG. 3B), to the input terminals of the switching regulator.

Figure 4:
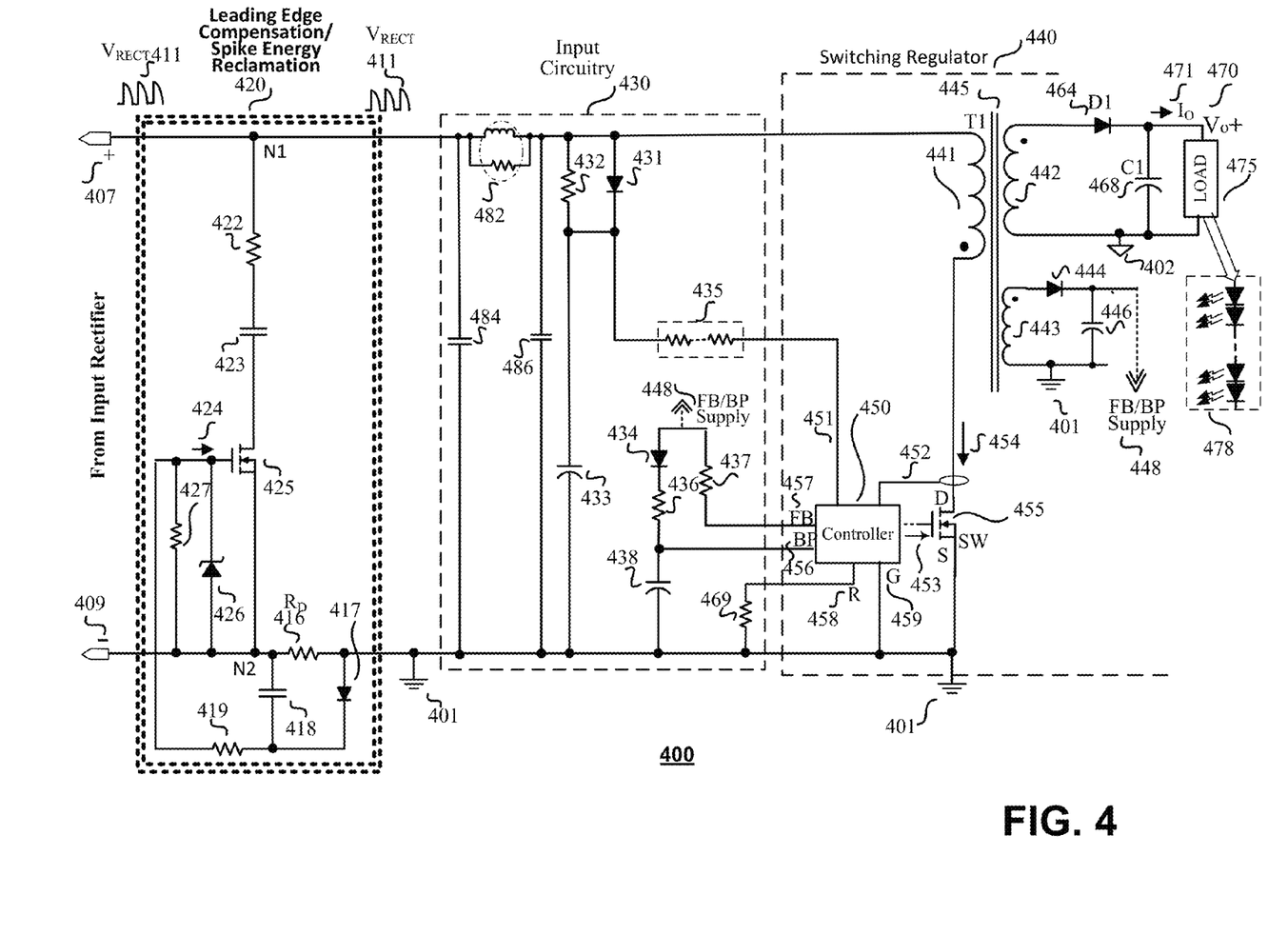
FIG. 4 is an example schematic diagram illustrating a power converter having a leading edge compensation circuit, in accordance with the teachings of the present disclosure.

FIG. 4 is an example schematic diagram illustrating a power converter 400 having a leading edge compensation circuit 420, in accordance with the teachings of the present disclosure. FIG. 4 shows another detail schematic of a leading edge compensation with spike energy reclamation circuit block 420 which is coupled to input terminals 407 and 409 from input rectifier of the LED driver and receives $V_{RECT}$ 411. Circuit block 420 includes a bleeder circuit across nodes N1 and N2 including resistor 422, capacitor 423 and bleeder switch 425 (e.g., a MOSFET).

The DC supply for bleeder activation is generated by charging capacitor 418 through diode 417 from the voltage drop on the damper resistor 416 during the triac turn on spike. The average charged voltage of capacitor 418 through divider resistors 419 and 427 provides activation gate signal 424 (i.e., control signal) for the bleeder switch 425 in each switching cycle. Zener diode 426 across gate terminal may protect and limit/clamp to a safe level any overshoot voltages that may appear on the gate of switch.

The input circuitry 430 coupled at the interface of switching regulator 440 in the example of FIG. 4 includes a pi filter of RL differential filter 482 and Y capacitors 484 and 486. The input circuitry 430 also provides control signals for the controller 450 which is included in the switching regulator 440. The primary side voltage signal 451 is provided through a resistor module 435 from the RC sense components including resistor 432 and capacitor 433 across the voltage to primary winding 441. Diode 431 provides a fast charging path to the capacitor 433 during transients.

The auxiliary (third) winding 443 on transformer T1 445 is referenced to primary ground 401 and through rectifier 444 and capacitor 446 provides a DC filtered voltage 448 for the feedback sense signal FB and the bypass supply BP. The FB/BP supply 448 at input circuitry 430 through a series resistor provides a FB 457 current signal on terminal 457 of the controller 450. The supply voltage to the controller terminal BP 456 is also provided by FB/BP supply 448 across the capacitor 438 by charging capacitor 438 through diode 434 and resistor 436. Terminal 452 on the controller 450 receives information of drain current 454. Terminal R 458 may be a multi-purpose terminal to select mode of operation through the value of the resistor 469 on this terminal. The ground terminal G of the controller 450 at primary side is referenced to the primary ground 401.

The secondary winding 442 on transformer 445 generates the output voltage Vo 470 (referenced to the secondary isolated ground 402) through the secondary rectifier D1 464 and bulk filter capacitor C1 468 across the load 475 (in one example LED array 478) with regulated load current Io 471.

Figures 5A, 5B:
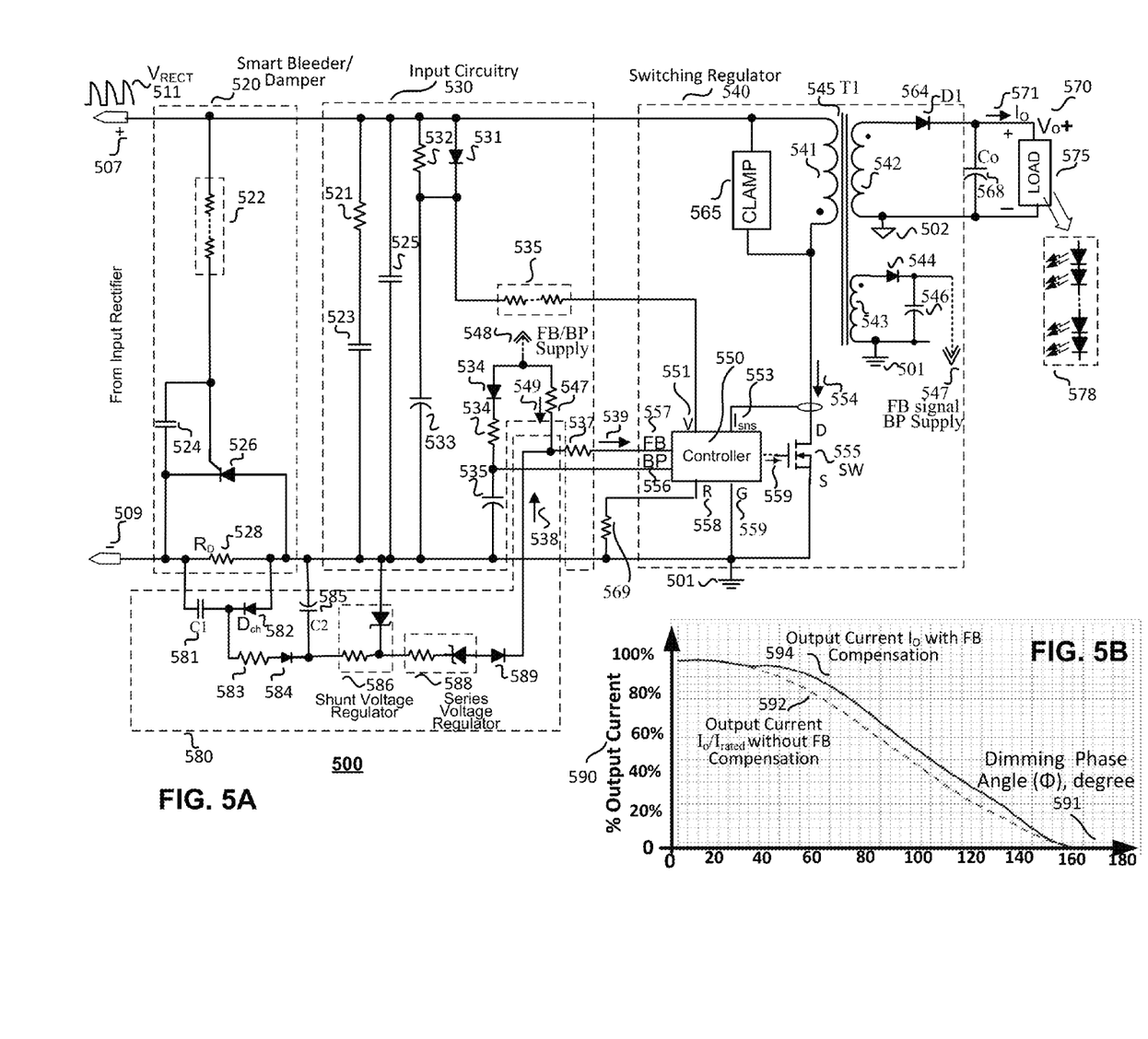
FIG. 5A is an example schematic diagram illustrating a power converter and further detail of a spike energy reclamation circuit, in accordance with the teachings of the present disclosure.
FIG. 5B is an example waveform of a power converter output current with and without feedback compensation with respect to changes in a dimming phase angle, in accordance with the teachings of the present disclosure.

FIG. 5A is an example schematic diagram illustrating a power converter 500 and further detail of a spike energy reclamation circuit 580, in accordance with the teachings of the present disclosure. In the illustrated example of FIG. 5A the output of the spike energy reclamation circuit 580 is coupled to the controller 550 to provide feedback compensation, in accordance with the teachings of the present disclosure.

In FIG. 5A the smart bleeder plus damper circuit 520 is coupled at input terminals 507 and 509 from $V_{RECT}$ 511 before the input circuitry 530 and switching regulator 540. The smart bleeder plus damper circuit 520 in one example includes a resistor module 522 in series with capacitor 524 which form a passive bleeder. The damper resistor 528 is in return path of the input current to damp the turn on spike of the triac. Thyristor 326 is coupled across the damper resistor 328 and the control terminal of the thyristor 526 is coupled across capacitor 524. The anode and cathode of thyristor 526 may shunt the damper resistor 528 whenever capacitor 524 is charged to the activation threshold of thyristor 526. At leading edge turn on a spike current appears through the bleeder and no voltage appears across the capacitor 524. At this time thyristor 526 remains OFF (open circuit) and return current 529 passes through the damper resistor 528 to damp/suppress the spike. After the turn on spike and during conduction angle of triac, voltage across capacitor 524 rises to the threshold of thyristor 526 and resistor 528 is shorted by thyristor 526 to eliminate the damper resistor loss and increase efficiency.

One example of the spike energy reclamation circuit 580, as an embodiment of this application, is introduced in block 580. This circuit block 580 recovers the spike energy drop on the damper resistor 528 to generate a control signal 538 to be utilized in controller 550 of the switching regulator 540 (e.g., to maintain the input current at or above the holding current of the triac). From across the damper resistor 528 the voltage drop of the triac turn on spike charges capacitor C1 581 through diode $D_{ch}$ 582 which also prevents any discharge of capacitor 381 during negative oscillations across the damper resistor. Voltage across capacitor 581 through resistor 583 and diode 584 charges the averaging capacitor C2 585. The multi cycle averaged voltage across capacitor C2 585 through a shunt voltage regulator 586, a series voltage regulator 588 and a diode 589 generates a feedback compensating current signal 538 that in the feedback resistor 537 adds up to the original feedback current signal 549 which comes through a series resistor 547 from the FB/BP supply 548. The total current signals 539 (549 plus 538) in the feedback resistor 537 provides the FB current signal 557 on terminal 457 of the controller 450. The total feedback current signal 539 to the FB terminal 557 controls the feedback loop. The FB/BP supply 548 at input circuitry 530 may also provide the supply voltage to the controller terminal BP 456 across the bypass capacitor 538 through diode 534 and resistor 536.

The FB/BP supply 548 at input circuitry 530 is provided through the auxiliary (third) winding 543 on transformer T1 545 which is referenced to the primary ground 501. The ac flyback voltage on winding 543 through rectifier 544 and capacitor 546 provides a DC filtered voltage 548 for the feedback sense signal FB and the bypass supply BP.

The primary bus voltage signal 551 is provided through a resistor module 535 from the RC sense components, resistor 532 and capacitor 533 across the voltage to the primary winding 541. Diode 531 provides a fast charging path to the capacitor 533 during transients.

Terminal 552 on the controller 550 receives information of drain current 554 and terminal R 558 may be a multi-purpose terminal to select mode of operation through the value of the resistor 569 on this terminal. The ground terminal G 559 of the controller 550 at primary side is referenced to the primary ground 501.

The secondary winding 542 on transformer 545 generates the output voltage Vo 570 (referenced to the secondary isolated ground 502) through the secondary rectifier D1 564 and bulk filter capacitor C1 568 across the load 575 (in one example LED array 578) with regulated load current Io 571.

FIG. 5B shows an example waveform of a power converter output current 590 with and without feedback compensation with respect to changes in a dimming phase angle 591, in accordance with the teachings of the present disclosure. The horizontal axis 591 presents the dimming phase angle, $\phi$ from zero to 180 degrees. The vertical axis 590 presents the output current as a percentage/ratio of the rated current. The dotted line (curve) 592 presents the output current percentage ($100*I_o/I_{rated}$) without the FB compensation and the solid line (curve) 594 presents the output current percentage ($100*I_o/I_{rated}$) after adding the feature of FB compensation based on the teachings of the present disclosure.

Figure 6A:
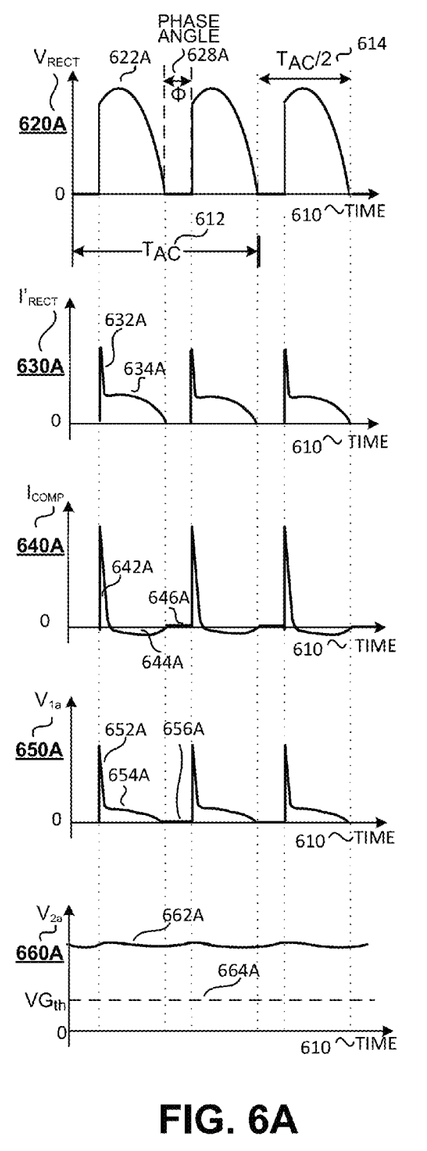
FIG. 6A illustrates various example waveforms of the engaged operation of the leading edge compensation circuit of FIGS. 2A and 2B.
Figure 6B:
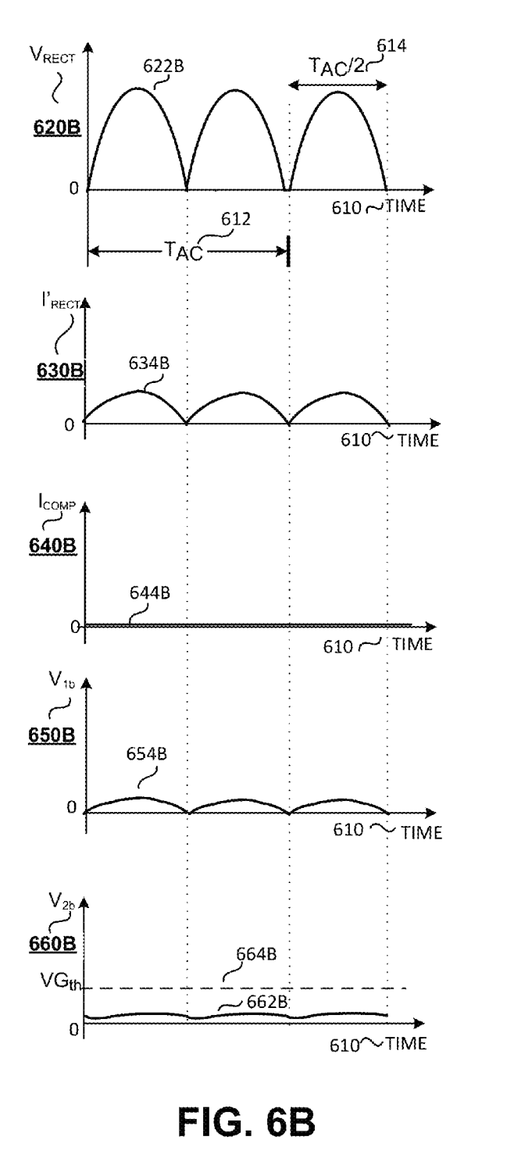
FIG. 6B illustrates various example waveforms of the disengaged operation of the leading edge compensation circuit of FIGS. 2A and 2B.

FIG. 6A illustrates various example waveforms of the engaged operation of the leading edge compensation circuit of FIGS. 2A and 2B, while FIG. 6B illustrates various example waveforms of the disengaged operation of the leading edge compensation circuit of FIGS. 2A and 2B. FIG. 6A shows the various waveforms in about 60 degree of dimming angle (120 degree of conduction angle) when the leading edge compensation circuit of FIGS. 2A and 2B are activated/engaged in a power converter in comparison to FIG. 6B that shows the same variety example waveforms for the disengaged operation of the leading edge compensation circuit in a power converter without any dimming (in condition of 0 dimming, full 180 degree of conduction).

Graph 620A shows the rectified phase controlled sinusoidal input voltage $V_{RECT}$ 622A versus time 610 with a full cycle ac period $T_{AC}$ 612 and a half period $T_{AC}/2$ 614. The triac phase angle $\phi$ 628A is about 60 degree of dimming phase angle (equivalent to 120 degree of conduction angle). Graph 620B of FIG. 6B illustrates the rectified sinusoidal input voltage $V_{RECT}$ 622B with no dimming and disengagement of the leading edge compensation circuit wherein $V_{RECT}$ 622B versus time 610 shows a full conduction (phase angle $\phi$=0; conduction angle=180 degree) during each half cycle period $T_{AC}/2$ 614.

Graph 630A illustrates rectified return current $I'_{RECT}$ that is the rectified triac current pulses 634A versus time 610 where the triac turn on spikes 632A show up at rising edge of the current pulses. In comparison, graph 630B $I'_{RECT}$ shows the full conduction half cycle triac rectified current pulses 634B with no dimming and disengagement of the leading edge compensation circuit.

Graph 640A illustrates the compensation current $I_{COMP}$ through the active bleeder that shows a rising edge spike current 642A at triac turn on while the spike energy reclamation/recovery on the damper resistor generates the gating signal for the bleeder active switch. After the turn on spike, the compensation current with a slight negative oscillation 644A comes back to zero and remains zero during the phase angle cut of triac 646A. On the other hand graph 640B shows full conduction of triac with no dimming and disengagement of the leading edge compensation circuit and verifies that the compensation current through bleeder circuit remains at zero level 644B.

Graph 650A illustrates the voltage drop $V_{1a}$ across the damper resistor (216A in FIG. 2A or 216B in FIG. 2B) versus time 610 that follows the waveform of $I'_{RECT}$ rectified triac current pulses (634A in graph 630A) with a spike voltage drop 652A at triac turn on and sinusoidal voltage drop 654A during the triac conduction. Graph 650B $V_{1b}$ the voltage drop $V_{1a}$ across the damper resistor in full half cycle conduction of triac 654B follows the rectified current pulses 634B in graph 630B with no dimming and disengagement of the leading edge compensation circuit.

Graph 660A presents the averaged (integrated) voltage $V_{2a}$ across the averaging/storage capacitor ($C_{2A}$ or $C_{2B}$ in FIG. 2A or 2B respectively). In a dimming condition of the triac and with engagement of the leading edge compensation circuit (220A or 220B in FIG. 2A or 2B respectively), the averaged voltage (average of $V_{1a}$ across capacitor $C_{1a}$ in graph 650A), which is smoothed across the capacitor $C_{2A}$ is depicted as the low ripple voltage level 662A. In the dimming condition of when the triac voltage level 662A rises above the MOSFET gate threshold voltage 664A, the compensation circuit is actively engaged. However, in graph 660B the voltage across capacitor $C_{2A}$ (average of $V_{1b}$ across capacitor $C_{2a}$ in graph 650A) which is smoothed across the capacitor $C_{2A}$ is depicted as the voltage level 662B which remains at a lower level than the MOSFET gate threshold voltage 664B and the compensation circuit is kept disengaged (MOSFET switch open) which results in lowering loss by eliminating the bleeder loss and increasing the efficiency.

Figure 7A:
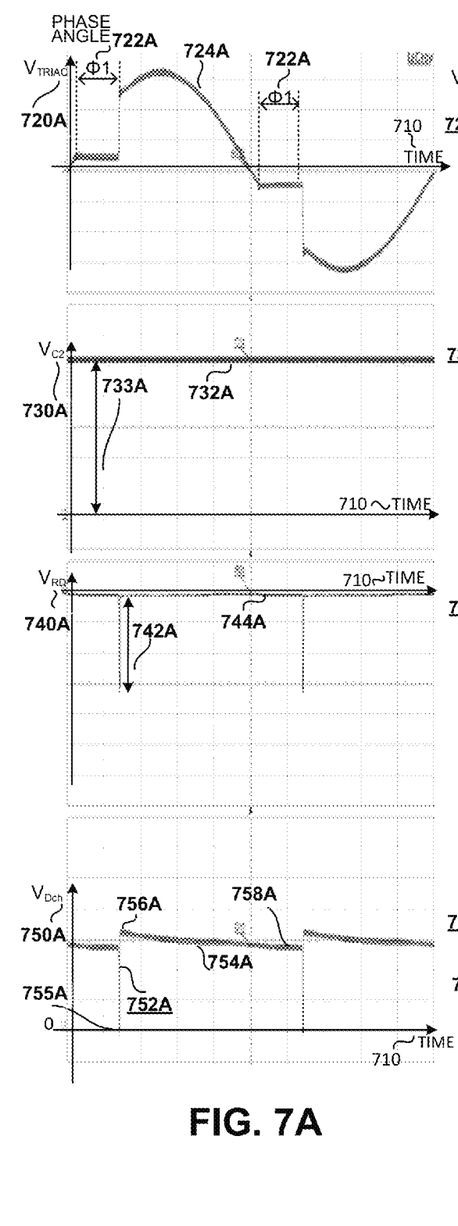
FIG. 7A illustrates example waveforms of a triac input voltage, an averaging capacitor voltage, a damper resistor voltage, and a diode voltage, when a dimming phase angle φ is about thirty degrees (30°), in accordance with the teaching of the present disclosure.
Figure 7B:
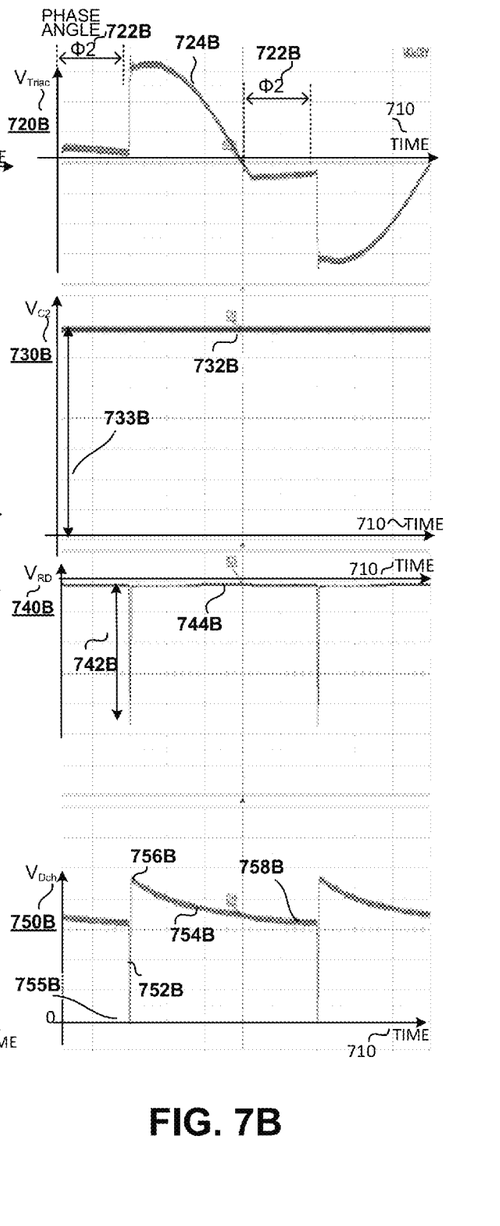
FIG. 7B illustrates example waveforms of a triac input voltage, an averaging capacitor voltage, a damper resistor voltage, and a diode voltage, when a dimming phase angle φ is about sixty degrees (60°), in accordance with the teaching of the present disclosure.

FIG. 7A illustrates example waveforms of a triac input voltage, an averaging capacitor voltage, a dimmer resistor voltage, and a diode voltage, when a dimming phase angle $\phi$ is about thirty degrees (30°), in accordance with the teaching of the present disclosure. FIG. 7B illustrates example waveforms of a triac input voltage, an averaging capacitor voltage, a dimmer resistor voltage, and a diode voltage, when a dimming phase angle $\phi$ is about sixty degrees) (60°, in accordance with the teaching of the present disclosure. FIGS. 7A and 7B illustrate example waveforms of a smart bleeder and the damper resistor spike energy reclamation circuit that may be included in an LED driver, such as that illustrated in FIG. 5A.

A DC supply is generated from the reclaimed spike energy on the damper resistor that in one example may be coupled to the controller of switching regulator to provide a feedback compensation, in accordance with the teachings of the present disclosure as shown in schematics of FIG. 5A. FIG. 7A presents the related waveforms for a triac dimming phase angle of about 30 degrees and FIG. 7B presents the same waveforms for a triac dimming phase angle of about 60 degrees to compare the differences in values and operation.

Graph 720A shows the ac phase controlled sinusoidal input voltage $V_{TRIAC}$ 724A versus time 710 with a dimming phase angle φ1 722A that for the example of FIG. 7A is around 30 degrees. On the other hand graph 720B shows the same ac phase controlled sinusoidal input voltage $V_{TRIAC}$ 724B versus time 710 with a dimming phase angle φ2 722A that for the example of FIG. 7B is around 60 degrees.

Graph 730A, $V_{c2}$ presents the DC supply voltage 732A with an amplitude/value of 733A generated by averaging the instantaneous voltage drop on the damper resistor at turn on spike current 742A (on graph 740A) across the averaging capacitor $C_2$ 585 in FIG. 5A for a φ1=30 degree of dimming phase angle.

Graph 740A, $V_{RD}$, presents the instantaneous voltage drop on the damper resistor at turn on spike 742A (negative in regards to the measurement ground 501). After the turn on spike the voltage drop on the damper resistor remains on almost zero 744A (due to the activation/conduction of thyristor 526).

Graphs 730B and 740B of FIG. 7B on the right side, show same parameters as graphs 730A and 740A on FIG. 7A. 730B shows the DC supply voltage across the averaging capacitor $C_2$ 585 for an increased dimming phase angle of φ2=60 degree Graph 740B shows the instantaneous voltage drop on the damper resistor (at turn on spike 742B and after the turn on spike the voltage drop on the damper resistor remains on almost zero level 744B).

Comparison of graphs 730A and 740A with graphs 730B and 740B confirms that below 90 degree of dimming phase angle when the triac turn on rising edge increases (due to the increasing dimming phase angle), the generated DC supply voltage also increases (733B compared to 733A) as a result of the increase in amplitude of turn on spike voltage drop (742B compared to 742A).

Graphs 750A and 750B show the voltage $V_{Dch}$ across the charging diode $D_{ch}$ 582 for two test conditions of dimming phase angles φ1=30° and φ2=60°. When diode $D_{ch}$ 582 is conducting during the turn on spike to charge capacitor C1 the forward drop of diode reaches to almost zero (755 A or 755B). However, after the turn on spike, the reverse voltage across diode $D_{ch}$ 582 shows an overshoot (756A or 756B) before settling on the DC voltage level (758A or 758B) across the averaging capacitor C2 585. As explained above: the higher dimming phase angle (φ2=60° compared to φ1=30° will result in a higher turn on spike voltage (752B compared to 752A) as well as the higher DC generated voltage levels across the averaging capacitor C2 585 (756B and 758B compared to 756A and 758A).

The above description of illustrated examples of the present invention, including what is described in the Abstract, is not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

By way of example, a compensation circuit for use in a power converter may include a compensator; a switch coupled to selectively engage the compensator in response to a control signal, wherein, when engaged, the compensator is coupled to maintain an input current of the power converter to be equal to or greater than a minimum current; and a leading edge dimming detection circuit coupled to generate the control signal to engage the compensator in response to detecting leading edge dimming at an input of the power converter. In one embodiment, the minimum current is equal to a holding current threshold of a dimmer circuit that is coupled to the input of the power converter. In one example, the control signal keeps the compensator disengaged in response to trailing edge dimming at the input of the power converter. In another embodiment, the control signal keeps the compensator disengaged in response to the absence of dimming at the input of the power converter. The compensator may be coupled to draw a compensation current from the input of the power converter, wherein the compensator comprises a bulk capacitance module. Continuing with this example, the bulk capacitance module may consist of a capacitance coupled such that the compensation current flows through the capacitance. In one embodiment, the compensator is coupled to draw a compensation current from the input of the power converter, wherein the compensator comprises a current sink. The current sink may include a resistance; and a capacitance coupled to the resistance such that the compensation current flows through the resistance and through the capacitance. In another example, the current sink comprises: a resistance having a first terminal and a second terminal; a first capacitance having a third terminal and a fourth terminal, wherein the second terminal of the resistance is coupled to the third terminal of the first capacitance; and a second capacitance having a fifth terminal and a sixth terminal, wherein the first terminal of the resistance is coupled to the fifth terminal of the second capacitance and the fourth terminal of the first capacitance is coupled to the sixth terminal of the second capacitance. The second capacitance may have a capacitance value greater than a capacitance value of the first capacitance. For example, the capacitance value of the first capacitance may be in the range of about one hundred nanofarads (100 nF) to about three hundred nanofarads (300 nF). In another example, the capacitance value of the second capacitance is at least about one microfarad (1 μF). The switch may comprise a metal oxide semiconductor field effect transistor (MOSFET) having a gate coupled to receive the control signal. In one embodiment, the leading edge dimming detection circuit is coupled to detect a current spike in a rectified input current of the power converter, and to generate the control signal to engage the compensator in response thereto, wherein the current spike corresponds with the turning on of an input voltage of the power converter by a dimming circuit during leading edge dimming. The leading edge dimming detection circuit may include a current sense resistance coupled such that the rectified input current flows through the current sense resistance to develop a first voltage across the current sense resistance. In one aspect, the compensator is coupled to the switch such that a compensation current flows through the compensator and through the switch between a first node and a second node of the power converter when the compensator is engaged, wherein the current sense resistance is coupled between the second node and an input circuit of the power converter. In another aspect, the compensator may be coupled to the switch such that a compensation current flows through the compensator and through the switch between a first node and a second node of the power converter when the compensator is engaged, wherein the current sense resistance is coupled between the second node and an input rectifier of the power converter. The current sense resistance functions to detect the current spike for the leading edge dimming detection circuit and functions as a damper resistor to limit the current spike in the rectified input current. The leading edge dimming detection circuit may further comprise a capacitance coupled to be charged in response to the first voltage developed across the current sense resistance, wherein the control signal is generated in response to a second voltage across the capacitance. The control signal controls the switch to engage the compensator when the second voltage is above a threshold voltage of the switch, where substantially no current flows through the compensator when the compensator is disengaged. In one embodiment, the leading edge dimming detection circuit is coupled to generate the control signal to engage the compensator only in response to detecting leading edge dimming at the input of the power converter.

By way of another example, a power converter includes an energy transfer element coupled between an input and an output of the power converter; a controller coupled to control a transfer of energy between the input and the output of the power converter; and a leading edge compensation circuit coupled to the input of the power converter. The leading edge compensation circuit includes: a compensator; a switch coupled to selectively engage the compensator in response to a control signal, wherein, when engaged, the compensator is coupled to maintain an input current of the power converter to be equal to or greater than a minimum current; and a leading edge dimming detection circuit coupled to generate the control signal to engage the compensator in response to detecting leading edge dimming at the input of the power converter. The minimum current may be equal to a holding current threshold of a dimmer circuit that is coupled to the input of the power converter. The control signal may keep the compensator disengaged in response to trailing edge dimming at the input of the power converter. In another embodiment, the control signal keeps the compensator disengaged in response to the absence of dimming at the input of the power converter. The compensator is coupled to draw a compensation current from the input of the power converter, wherein the compensator comprises a bulk capacitance module. The bulk capacitance module may consist of a capacitance coupled such that the compensation current flows through the capacitance. The compensator may be coupled to draw a compensation current from the input of the power converter, wherein the compensator comprises a current sink. The current sink may comprise a resistance; and a capacitance coupled to the resistance such that the compensation current flows through the resistance and through the capacitance. In another embodiment, the current sink comprises: a resistance having a first terminal and a second terminal; a first capacitance having a third terminal and a fourth terminal, wherein the second terminal of the resistance is coupled to the third terminal of the first capacitance; and a second capacitance having a fifth terminal and a sixth terminal, wherein the first terminal of the resistance is coupled to the fifth terminal of the second capacitance and the fourth terminal of the first capacitance is coupled to the sixth terminal of the second capacitance. The second capacitance has a capacitance value greater than a capacitance value of the first capacitance. For example, the capacitance value of the first capacitance may be in the range of about one hundred nanofarads (100 nF) to about three hundred nanofarads (300 nF). The capacitance value of the second capacitance is at least about one microfarad (1 µF) and the switch may comprises a metal oxide semiconductor field effect transistor (MOSFET) having a gate coupled to receive the control signal. In one aspect, the leading edge dimming detection circuit is coupled to detect a current spike in a rectified input current of the power converter, and to generate the control signal to engage the compensator in response thereto, wherein the current spike corresponds with the turning on of an input voltage of the power converter by a dimming circuit during leading edge dimming. In another aspect, the leading edge dimming detection circuit comprises a current sense resistance coupled such that the rectified input current flows through the current sense resistance to develop a first voltage across the current sense resistance. The compensator may be coupled to the switch such that a compensation current flows through the compensator and through the switch between a first node and a second node of the power converter when the compensator is engaged, wherein the current sense resistance is coupled between the second node and an input circuit of the power converter. In another example, the compensator may be coupled to the switch such that a compensation current flows through the compensator and through the switch between a first node and a second node of the power converter when the compensator is engaged, wherein the current sense resistance is coupled between the second node and an input rectifier of the power converter. In some embodiments, the current sense resistance functions to detect the current spike for the leading edge dimming detection circuit and as well functions as a damper resistor to limit the current spike in the rectified input current. The leading edge dimming detection circuit may further comprise a capacitance coupled to be charged in response to the first voltage developed across the current sense resistance, wherein the control signal is generated in response to a second voltage across the capacitance. The control signal controls the switch to engage the compensator when the second voltage is above a threshold voltage of the switch. Substantially no current may flow through the compensator when the compensator is disengaged. The leading edge dimming detection circuit is coupled to generate the control signal to engage the compensator only in response to detecting leading edge dimming at the input of the power converter.

In yet another example, an apparatus includes a load; and a power converter coupled to provide a regulated output current to the load, where the power converter includes an energy transfer element coupled between an input and an output of the power converter, wherein the output of the power converter is coupled to the load; a controller coupled to control a transfer of energy between the input and the output of the power converter; and a leading edge compensation circuit coupled to the input of the power converter. The leading edge compensation circuit may include: a compensator; a switch coupled to selectively engage the compensator in response to a control signal, wherein, when engaged, the compensator is coupled to maintain an input current of the power converter to be equal to or greater than a minimum current; and a leading edge dimming detection circuit coupled to generate the control signal to engage the compensator in response to detecting leading edge dimming at the input of the power converter. The load may include one or more light emitting diodes (LEDs).

One example of the present disclosure may include a compensation circuit that is for use in a power converter. The compensation circuit comprises: a current sink, wherein the current sink is coupled to selectively draw a compensation current from an input of the power converter such that an input current of the power converter is equal to or greater than a minimum current, wherein the current sink includes a first resistance and a first capacitance coupled to the first resistance such that the compensation current flows through the first resistance and through the first capacitance when the current sink is engaged; a switch coupled to selectively engage the current sink in response to a control signal, wherein, when engaged, the compensation current flows through the first resistance, the first capacitance, and through the switch between a first node and a second node of the power converter; and a leading edge dimming detection circuit coupled to the switch to generate the control signal to engage the current sink in response to detecting a current spike in a rectified input current of the power converter, wherein the current spike corresponds with the turning on of an input voltage of the power converter by a triac dimming circuit during leading edge dimming. The leading edge dimming detection circuit includes: a current sense resistance coupled between the second node and an input circuit of the power converter, such that the rectified input current flows through the current sense resistance to develop a first voltage across the current sense resistance; and a second capacitance coupled to be charged in response to the first voltage developed across the current sense resistance, wherein the control signal is generated in response to a second voltage across the second capacitance and wherein the control signal controls the switch to engage the current sink when the second voltage is above a threshold voltage of the switch. In one aspect, the switch includes a metal oxide semiconductor field effect transistor (MOSFET) having a gate terminal coupled to receive the control signal, and a drain terminal and a source terminal, wherein when the MOSFET is enabled, the compensation current flows between the drain terminal and the source terminal, and wherein the threshold voltage of the switch is a gate threshold voltage of the MOSFET. The leading edge dimming detection circuit may further include: a first diode having an anode coupled to the current sense resistance and a cathode coupled to the second capacitance, the first diode to provide a current path to charge the second capacitance; a second resistance having one terminal coupled to the second capacitance and another terminal coupled to the gate terminal of the MOSFET; a third resistance having one terminal coupled to the gate terminal of the MOSFET and another terminal coupled to the second node of the power converter; and a Zener diode having an anode coupled to the second node of the power converter and a cathode coupled to the gate terminal of the MOSFET, the Zener diode to limit a voltage on the gate terminal of the MOSFET. The compensation circuit may include a current sink, wherein the current sink is coupled to selectively draw a compensation current from an input of the power converter such that an input current of the power converter is equal to or greater than a minimum current when the current sink is engaged. The current sink, in one embodiment, may include: a first resistance having a first terminal and a second terminal; a first capacitance having a third terminal and a fourth terminal, wherein the second terminal of the first resistance is coupled to the third terminal of the first capacitance; a second capacitance having a fifth terminal and a sixth terminal, wherein the first terminal of the first resistance is coupled to the fifth terminal of the second capacitance and the fourth terminal of the first capacitance is coupled to the sixth terminal of the second capacitance; a switch coupled to selectively engage the current sink in response to a control signal, wherein, when engaged, the compensation current flows through the current sink and through the switch between a first node and a second node of the power converter; and a leading edge dimming detection circuit coupled to the switch to generate the control signal to engage the current sink in response to detecting a current spike in a rectified input current of the power converter, wherein the current spike corresponds with the turning on of an input voltage of the power converter by a triac dimming circuit during leading edge dimming. In one embodiment, the leading edge dimming detection circuit includes: a current sense resistance coupled between the second node and a rectifier circuit of the power converter, such that the rectified input current flows through the current sense resistance to develop a first voltage across the current sense resistance; and a third capacitance coupled to be charged in response to the first voltage developed across the current sense resistance, wherein the control signal is generated in response to a second voltage across the third capacitance and wherein the control signal controls the switch to engage the current sink when the second voltage is above a threshold voltage of the switch. Continuing with this example, the switch may include a metal oxide semiconductor field effect transistor (MOSFET) having a gate terminal coupled to receive the control signal, and a drain terminal and a source terminal, wherein when the MOSFET is enabled, the compensation current flows between the drain terminal and the source terminal, and wherein the threshold voltage of the switch is a gate threshold voltage of the MOSFET. In another embodiment, the leading edge dimming detection circuit further includes: a first diode having an anode coupled to the current sense resistance and a cathode coupled to the second capacitance, the first diode to provide a current path to charge the third capacitance; a second diode having an anode and a cathode, wherein the anode of the second diode is coupled to the second capacitance; a second resistance having one terminal coupled to the cathode of the second diode and another terminal coupled to the gate terminal of the MOSFET; and a fourth capacitance having one terminal coupled to the cathode of the second diode and another terminal coupled to the second node of the power converter. The leading edge dimming detection circuit may further include: a third resistance having one terminal coupled to the gate terminal of the MOSFET and another terminal coupled to the second node of the power converter; and a Zener diode having an anode coupled to the second node of the power converter and a cathode coupled to the gate terminal of the MOSFET, the Zener diode to limit a voltage on the gate terminal of the MOSFET.

In one example, a compensation circuit is provided that is for use in a power converter. The compensation circuit may comprise a bulk capacitor module, wherein the bulk capacitor module is coupled to selectively draw a compensation current from an input of the power converter such that an input current of the power converter is equal to or greater than a minimum current; a switch coupled to selectively engage the bulk capacitor module in response to a control signal, wherein, when engaged, the compensation current flows through the first capacitance and through the switch between a first node and a second node of the power converter; and a leading edge dimming detection circuit coupled to the switch to generate the control signal to engage the bulk capacitor module in response to detecting a current spike in a rectified input current of the power converter, wherein the current spike corresponds with the turning on of an input voltage of the power converter by a triac dimming circuit during leading edge dimming. The leading edge dimming detection circuit includes: a current sense resistance coupled between the second node and an input circuit of the power converter, such that the rectified input current flows through the current sense resistance to develop a first voltage across the current sense resistance; and a second capacitance coupled to be charged in response to the first voltage developed across the current sense resistance, wherein the control signal is generated in response to a second voltage across the second capacitance and wherein the control signal controls the switch to engage the bulk capacitor module when the second voltage is above a threshold voltage of the switch. The switch may include a metal oxide semiconductor field effect transistor (MOSFET) having a gate terminal coupled to receive the control signal, and a drain terminal and a source terminal, wherein when the MOSFET is enabled, the compensation current flows between the drain terminal and the source terminal, and wherein the threshold voltage of the switch is a gate threshold voltage of the MOSFET. In some embodiments, the leading edge dimming detection circuit further includes: a first diode having an anode coupled to the current sense resistance and a cathode coupled to the second capacitance, the first diode to provide a current path to charge the second capacitance; a first resistance having one terminal coupled to the second capacitance and another terminal coupled to the gate terminal of the MOSFET; a second resistance having one terminal coupled to the gate terminal of the MOSFET and another terminal coupled to the second node of the power converter; and a Zener diode having an anode coupled to the second node of the power converter and a cathode coupled to the gate terminal of the MOSFET, the Zener diode to limit a voltage on the gate terminal of the MOSFET. The bulk capacitor module may include a capacitor bank of two or more parallel connected capacitors.

Continuing with yet another example, a power converter may comprise: an energy transfer element coupled between an input and an output of the power converter; a switch coupled to the energy transfer element to control a transfer of energy between the input and the output of the power converter; a controller coupled to control switching of the switch to regulate an output quantity of the power converter; a damper circuit coupled to suppress a spike in an input current of the power converter, wherein the spike in the input current corresponds with a turn-on event of an input voltage of the power converter by a leading edge dimming circuit that is to be coupled to the input of the power converter; and a spike energy reclamation circuit coupled to the damper circuit to store energy generated by the spike in the input current and to generate a signal for use by the power converter in response thereto. The damper circuit may be an active damper circuit coupled to be selectively engaged to suppress the spike in the input current for only a portion of the turn-on event. The energy stored by the spike energy reclamation circuit is generated during the portion of the turn-on event that the active damper circuit is engaged. The signal indicates the presence of leading edge dimming by the dimming circuit at the input of the power converter. The power converter may further comprise an active bleeder circuit coupled to be engaged to maintain the input current of the power converter to be equal to or greater than a minimum current in response to the signal indicating the presence of leading edge dimming. The minimum current may be equal to a holding current threshold of the dimming circuit. A magnitude of the signal is responsive to an amount of dimming by the dimming circuit at the input of the power converter. The magnitude of the signal increases with increases in a phase angle of voltage removed from the input voltage by the dimming circuit when the phase angle is between zero (0) and ninety (90) degrees. The magnitude of the signal decreases with decreases in the phase angle of voltage removed from the input voltage by the dimming circuit when the phase angle is between ninety (90) and one hundred eighty (180) degrees. The example controller may include a feedback terminal coupled to receive a feedback current that is representative of the output quantity of the power converter, wherein the signal generated by the spike energy reclamation circuit is a compensation current that is added to the feedback current to increase the output quantity of the power converter. The damper circuit includes a first terminal and a second terminal, the spike energy reclamation circuit including: a first diode having an anode coupled to the first terminal of the damper circuit; and a storage capacitor having a third terminal coupled to a cathode of the first diode and a fourth terminal coupled to the second terminal of the damper circuit, wherein the signal is responsive to a first voltage across the storage capacitor. The damper circuit may include a damper resistance, wherein the first and second terminals of the damper circuit are terminals of the damper resistance. In one embodiment, the spike energy reclamation circuit further comprises an averaging capacitor coupled to generate a second voltage across the averaging capacitor with respect to an input return of the power converter, wherein the second voltage is an average of the first voltage over several line cycles of the input voltage, wherein the magnitude of the signal is representative of the second voltage across the averaging capacitor. Continuing with this example, the spike energy reclamation circuit may further comprise: a second diode having a cathode coupled to the averaging capacitor; and a resistance having one terminal coupled to the storage capacitor and another terminal coupled to an anode of the second diode. The averaging capacitor has a capacitance value greater than a capacitance value of the storage capacitor. For example, the capacitance value of the averaging capacitance is at least about one microfarad (1 µF).

In another example, a spike energy reclamation circuit is to be coupled to a damper circuit of a power converter to store energy generated by a spike in an input current that corresponds with a turn-on event of an input voltage of the power converter by a leading edge dimming circuit. The spike energy reclamation circuit comprises: a first diode having an anode to be coupled to a first terminal of the damper circuit; and a storage capacitor having a third terminal coupled to a cathode of the first diode and a fourth terminal to be coupled to the second terminal of the damper circuit, wherein the spike energy reclamation circuit generates a signal that is responsive to a first voltage across the storage capacitor.

In yet another example, an apparatus is provided that includes: a load; and a power converter coupled to provide a regulated output current to the load. The power converter comprises: an energy transfer element coupled between an input and an output of the power converter; a switch coupled to the energy transfer element to control a transfer of energy between the input and the output of the power converter; a controller coupled to control switching of the switch to regulate the output current; a damper circuit coupled to suppress a spike in an input current of the power converter, wherein the spike in the input current corresponds with a turn-on event of an input voltage of the power converter by a leading edge dimming circuit that is to be coupled to the input of the power converter; and a spike energy reclamation circuit coupled to the damper circuit to store energy generated by the spike in the input current and to generate a signal for use by the power converter in response thereto. The load may include one or more light emitting diodes (LEDs) and the dimming circuit may include a triac dimming circuit.

What is claimed is:

1. A power converter, comprising:
an energy transfer element coupled between an input and an output of the power converter;
a power switch coupled to the energy transfer element to control a transfer of energy between the input and the output of the power converter;
a controller coupled to control switching of the power switch to regulate an output of the power converter;
a leading edge dimming detection circuit coupled to generate a control signal in response to detecting leading edge dimming at the input of the power converter; and
a damper circuit coupled to suppress a spike in an input current of the power converter, wherein the spike in the input current corresponds with a turn-on event of an input voltage of the power converter by a leading edge dimming circuit that is to be coupled to the input of the power converter, wherein the leading edge dimming detection circuit further includes a spike energy reclamation circuit coupled to the damper circuit to store energy generated by the spike in the input current and to generate the control signal in response thereto.

2. The power converter of claim 1, further comprising:
a compensator coupled to the input of the power converter; and
a control switch coupled to selectively engage the compensator in response to the control signal indicating the detection of leading edge dimming, wherein, when engaged, the compensator is coupled to maintain an input current of the power converter to be equal to or greater than a minimum current.

3. A power converter, comprising:
an energy transfer element coupled between an input and an output of the power converter;
a power switch coupled to the energy transfer element to control a transfer of energy between the input and the output of the power converter;
a controller coupled to control switching of the power switch to regulate an output of the power converter;
a leading edge dimming detection circuit coupled to generate a control signal in response to detecting leading edge dimming at the input of the power converter;
a compensator coupled to the input of the power converter; and
a control switch coupled to selectively engage the compensator in response to the control signal indicating the detection of leading edge dimming, wherein, when engaged, the compensator is coupled to maintain an input current of the power converter to be equal to or greater than a minimum current,
wherein the leading edge dimming detection circuit is coupled to detect a current spike in a rectified input current of the power converter, and to generate the control signal to engage the compensator in response thereto, wherein the current spike corresponds with the turning on of an input voltage of the power converter by a dimming circuit during leading edge dimming, and wherein the leading edge dimming detection circuit comprises a current sense resistance coupled such that the rectified input current flows through the current sense resistance to develop a first voltage across the current sense resistance.

4. The power converter of claim 3, wherein the minimum current is equal to a holding current threshold of a dimmer circuit that is coupled to the input of the power converter.

5. The power converter of claim 3, wherein the control signal keeps the compensator disengaged in response to trailing edge dimming and in response to the absence of dimming at the input of the power converter.

6. The power converter of claim 3, wherein the compensator is coupled to draw a compensation current from the input of the power converter, wherein the compensator comprises a bulk capacitance module.

7. The power converter of claim 6, wherein the bulk capacitance module consists of a capacitance coupled such that the compensation current flows through the capacitance.

8. The power converter of claim 3, wherein the compensator is coupled to draw a compensation current from the input of the power converter, wherein the compensator comprises a current sink.

9. The power converter of claim 8, wherein the current sink comprises:
a resistance; and
a capacitance coupled to the resistance such that the compensation current flows through the resistance and through the capacitance.

10. The power converter of claim 8, wherein the current sink comprises:
a resistance having a first terminal and a second terminal;
a first capacitance having a third terminal and a fourth terminal, wherein the second terminal of the resistance is coupled to the third terminal of the first capacitance; and
a second capacitance having a fifth terminal and a sixth terminal, wherein the first terminal of the resistance is coupled to the fifth terminal of the second capacitance and the fourth terminal of the first capacitance is coupled to the sixth terminal of the second capacitance.

11. The power converter of claim 10, wherein the second capacitance has a capacitance value greater than a capacitance value of the first capacitance.

12. The power converter of claim 3, wherein the compensator is coupled to the control switch such that a compensation current flows through the compensator and through the control switch between a first node and a second node of the power converter when the compensator is engaged, wherein the current sense resistance is coupled between the second node and an input circuit of the power converter.

13. The power converter of claim 12, wherein the current sense resistance functions to detect the current spike for the leading edge dimming detection circuit and functions as a damper resistor to limit the current spike in the rectified input current.

14. The power converter of claim 12, wherein the leading edge dimming detection circuit further comprises a capacitance coupled to be charged in response to the first voltage developed across the current sense resistance, wherein the control signal is generated in response to a second voltage across the capacitance.

15. The power converter of claim 14, wherein the control signal controls the control switch to engage the compensator when the second voltage is above a threshold voltage of the control switch.

16. A power converter, comprising:
an energy transfer element coupled between an input and an output of the power converter;
a power switch coupled to the energy transfer element to control a transfer of energy between the input and the output of the power converter;
a controller coupled to control switching of the power switch to regulate an output of the power converter;

a damper circuit coupled to suppress a spike in an input current of the power converter, wherein the spike in the input current corresponds with a turn-on event of an input voltage of the power converter by a leading edge dimming circuit that is to be coupled to the input of the power converter; and a leading edge dimming detection circuit coupled to generate a control signal in response to detecting leading edge dimming at the input of the power converter, wherein the leading edge dimming detection circuit further includes a spike energy reclamation circuit coupled to the damper circuit to store energy generated by the spike in the input current and to generate the control signal in response thereto.

17. The power converter of claim 16, wherein the damper circuit is an active damper circuit coupled to be selectively engaged to suppress the spike in the input current for only a portion of the turn-on event.

18. The power converter of claim 17, wherein the energy stored by the spike energy reclamation circuit is generated during the portion of the turn-on event that the active damper circuit is engaged.

19. The power converter of claim 16, further comprising an active bleeder circuit coupled to be engaged to maintain the input current of the power converter to be equal to or greater than a minimum current in response to the control signal indicating the presence of leading edge dimming.

20. The power converter of claim 19, wherein the minimum current is equal to a holding current threshold of the dimming circuit.

21. The power converter of claim 16, wherein a magnitude of the stored energy and of the control signal is responsive to an amount of dimming by the dimming circuit at the input of the power converter.

22. The power converter of claim 21, wherein the controller includes a feedback terminal coupled to receive a feedback current that is representative of the output of the power converter, wherein the control signal generated by the spike energy reclamation circuit is a compensation current that is added to the feedback current to emulate an increase in the output of the power converter, such that the controller increases the input current of the power converter.

23. The power converter of claim 21, wherein the magnitude of the stored energy and of the control signal increases with increases in a phase angle of voltage removed from the input voltage by the dimming circuit when the phase angle is between zero (0) and ninety (90) degrees.

24. The power converter of claim 23, wherein the magnitude of the stored energy and of the control signal decreases with decreases in the phase angle of voltage removed from the input voltage by the dimming circuit when the phase angle is between ninety (90) and one hundred eighty (180) degrees.

25. The power converter of claim 21, wherein the damper circuit includes a first terminal and a second terminal, the spike energy reclamation circuit including:

a first diode having an anode coupled to the first terminal of the damper circuit; and a storage capacitor having a third terminal coupled to a cathode of the first diode and a fourth terminal coupled to the second terminal of the damper circuit, wherein the signal is responsive to a first voltage across the storage capacitor.

26. The power converter of claim 25, wherein the damper circuit includes a damper resistance, wherein the first and second terminals of the damper circuit are terminals of the damper resistance.

27. The power converter of claim 25, wherein the spike energy reclamation circuit further comprises an averaging capacitor coupled to generate a second voltage across the averaging capacitor with respect to an input return of the power converter, wherein the second voltage is an average of the first voltage over several line cycles of the input voltage, wherein the magnitude of the control signal is representative of the second voltage across the averaging capacitor.

28. The power converter of claim 27, wherein the spike energy reclamation circuit further comprises:

a second diode having a cathode coupled to the averaging capacitor; and a resistance having one terminal coupled to the storage capacitor and another terminal coupled to an anode of the second diode.

29. The power converter of claim 27, wherein the averaging capacitor has a capacitance value greater than a capacitance value of the storage capacitor.

* * * * *